United States Patent [19]
Ono et al.

[11] Patent Number: 6,001,507
[45] Date of Patent: Dec. 14, 1999

[54] NON-AQUEOUS ELECTROLYTE SECONDARY BATTERY

[75] Inventors: Takashi Ono; Hisayuki Kato; Yoshikatsu Yamamoto, all of Fukushima; Takai Mori, Tochigi, all of Japan

[73] Assignee: Sony Corporation, Tokyo, Japan

[21] Appl. No.: 08/992,459

[22] Filed: Dec. 17, 1997

[30] Foreign Application Priority Data

Dec. 24, 1996 [JP] Japan ..................... 8-344237

[51] Int. Cl.$^6$ .............. H01M 4/62; H01M 6/16; H01M 4/48; H01M 4/58
[52] U.S. Cl. ............. 429/217; 429/218.1; 429/231.1; 429/231.8; 429/324
[58] Field of Search ................. 429/217, 212, 429/214, 215, 216, 218.1, 221, 224, 231.1, 231.3, 231.5, 231.8, 324, 326–342

[56] References Cited

U.S. PATENT DOCUMENTS

| | | | |
|---|---|---|---|
| 5,340,670 | 8/1994 | Takami et al. | 429/194 |
| 5,348,818 | 9/1994 | Asami et al. | 429/213 |
| 5,380,606 | 1/1995 | Itou et al. | 429/194 |
| 5,468,571 | 11/1995 | Fujimoto et al. | 429/217 |
| 5,716,732 | 2/1998 | Imoto et al. | 429/122 |

FOREIGN PATENT DOCUMENTS

| | | |
|---|---|---|
| 6-275279 | 9/1994 | Japan . |
| 7-122303 | 5/1995 | Japan . |
| 8-315859 | 11/1996 | Japan . |
| 9-129240 | 5/1997 | Japan . |

*Primary Examiner*—Maria Nuzzolillo
*Assistant Examiner*—Jonathan Crepeau
*Attorney, Agent, or Firm*—Hill & Simpson

[57] ABSTRACT

A non-aqueous electrolyte battery which exhibits satisfactory reliability because reduction in the discharge capacity can be significantly prevented even after use with rapid temperature change and which enables excellent productivity to be realized. The non-aqueous electrolyte battery includes a cathode and an anode in which an active material for the cathode and/or an active material for the anode is integrated by a binder, wherein the binder for the cathode and/or the binder for the anode is a mixture of polyimide, which is soluble in an organic solvent, and a fluorine polymer. The polyimide is expressed by the following formula:

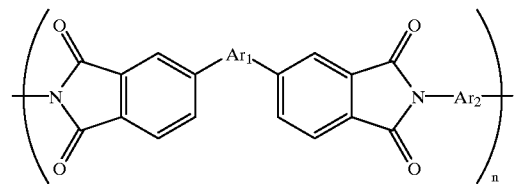

12 Claims, 1 Drawing Sheet

FIG.1

NON-AQUEOUS ELECTROLYTE SECONDARY BATTERY

BACKGROUND OF THE INVENTION

1. Field of the Invention

The present invention relates to a non-aqueous electrolyte battery having electrodes formed by integrating active materials by using a binder, and more particularly to an improvement in a binder.

2. Description of Prior Art

In recent years, the performance of electronic equipment has been improved and size reduction and portable structure have been realized as the electronic technology progresses. The explosion in the use of notebook type personal computers and portable telephones raises a demand for a non-aqueous electrolyte battery capable of reducing the size and the weight, enlarging the capacity and realizing a high energy density and satisfactory reliability.

In particular, a non-aqueous electrolyte secondary battery for use in a portable telephone is used both outdoors and indoors. Therefore, the non-aqueous electrolyte secondary battery is used in a very wide temperature range and a rapid change in the temperature of the non-aqueous electrolyte secondary battery takes place. Thus, excellent reliability has been required for the non-aqueous electrolyte secondary battery against temperatures and thermal shock.

In addition to the reliability against temperatures, the non-aqueous electrolyte secondary battery must have significantly satisfactory reliability without deterioration in the charge and discharge cycles performed for a long time.

At present, non-aqueous electrolyte batteries include non-aqueous electrolyte secondary batteries having a cathode made of a composite oxide containing lithium and an anode made of a material which is capable of occluding and discharging lithium ions, and non-aqueous electrolyte primary batteries having a cathode made of a chalcogen compound, from which lithium can be desorbed and into which the same can be inserted, and an anode made of lithium metal.

The electrode of the non-aqueous electrolyte secondary battery is manufactured in such a manner that an active material, that is, a monolithic carbon material, such as graphite or carbon black, is employed as a conductive material and a binder is used to integrate the conductive material. The binder is made of fluororesin, such as polyvinylidene fluoride (hereinafter called "PVdF") or polytetrafluoroethylene (hereinafter called "PTFE"), or an organic polymer, such as fluorine rubber, carboxylmethylcellulose (CMC), methylcellulose (MC) or polyimide.

Among the above-mentioned materials, PVdF and PTFE are employed as the binder for use in the electrodes of the non-aqueous electrolyte battery because of excellent oxidation resistance.

When a fluorine polymer, such as PVdF or PTFE, is employed as the binder, the binding force between the depolarizing mix for a cell and the collector however is too weak. In this case, use of the non-aqueous electrolyte battery in a state where rapid change in the temperature is repeated results in the depolarizing mix being desorbed from the collector. As a result, the capacity of the non-aqueous electrolyte battery is reduced undesirably.

On the other hand, polyimide is a binder exhibiting excellent binding properties. When polyimide is employed as the binder, the force for binding the depolarizing mix and the collector with each other can be enlarged. Thus, even if the non-aqueous electrolyte battery is used in a state where the rapid change in the temperature is repeated, the depolarizing mix is not desorbed from the collector. Therefore, there is a possibility that a non-aqueous electrolyte battery free from reduction in the capacity thereof and thus having excellent reliability can be realized.

Although polyimide exhibits excellent binding properties between the depolarizing mix and the collector, rigid molecular chains of the polymer cause the manufactured electrode to have a rigid characteristic. Therefore, when the foregoing polyimide is used as the binder, the manufactured electrode has a low tolerance to bending. Thus, cracks or the like of the electrode cannot be prevented and therefore the characteristics of the non-aqueous electrolyte battery deteriorate excessively.

In general, polyimide is not dissolved in any organic solvent. Therefore, the polyimide must be made to be soluble in an organic solvent when the polyimide is employed as the binder. Thus, the depolarizing mix is prepared by using thermoplastic polyamic acid or the like soluble in an organic solvent, and then applied to the collector and heated in a drying process so that polyamic acid is converted into imide. Since the polyamic acid is soluble in an organic solvent, excellent productivity can be realized when electrodes of the non-aqueous electrolyte batteries are manufactured.

When polyamic acid is heated so as to be formed into imide, water however is generated. Thus-generated water adversely affects the active material, as a result of which the discharge capacity of the non-aqueous electrolyte battery and the cycling characteristic of the non-aqueous electrolyte deteriorate excessively.

OBJECT AND SUMMARY OF THE INVENTION

In view of the foregoing, an object of the present invention is to provide a non-aqueous electrolyte battery free from excessive reduction in the discharge capacity even after use in a state where rapid change in the temperature takes place and exhibiting excellent productivity.

Another object of the present invention is to provide a non-aqueous electrolyte battery exhibiting an excellent cycling characteristic when formed into a chargeable secondary battery.

To achieve the foregoing objects, the inventors have researched and developed a polyimide having an imino group, thus resulting in a polyimide being obtained in which conversion to imide has been completed and which is soluble in an organic solvent.

According to the present invention, there is provided a non-aqueous electrolyte battery including a cathode and an anode, wherein an active material of the cathode and/or an active material of the anode is integrated by a binder, and the binder of the cathode and/or the binder of the anode is a mixture of polyimide, in which conversion to imide has been completed and which is soluble in an organic solvent, and a fluorine polymer.

It is preferable that the binder contains polyimide in a quantity not less than 5 wt % nor more than 90 wt %. It is preferable that the polyimide be a compound expressed by Chemical Formula 2.

[Chemical Formula 2]

where $Ar_1$ and $Ar_2$ are aryl and n is an integer not smaller than 1

If the content of the polyimide is larger than 90 wt %, the rigid molecular chains of the polyimide cause the manufactured electrode to have a rigid characteristic. Thus, the electrode has a low tolerance to bending. As a result, cracks are generated in the electrode and thus the discharge capacity is reduced excessively. If the content of the polyimide is smaller than 5 wt %, the effect of the excellent binding properties of the polyimide on the electrode becomes unsatisfactory. In this case, the major portion of the binder is composed of the fluorine polymer having poor binding properties. Therefore, use in rapid change in the temperature causes the depolarizing mix to be desorbed from the collector. As a result, the discharge capacity is excessively reduced.

It is preferable that the fluorine polymer be polyvinylidene fluoride. Since polyvinylidene fluoride exhibits excellent oxidation resistance and thus it is dissolved in an organic solvent in a process for preparing the depolarizing mix, the dispersion characteristic of the depolarizing mix can be improved and the binding properties can be improved.

Since the non-aqueous electrolyte secondary battery according to the present invention includes polyimide, in which conversion to imide has been completed, and which is soluble in an organic solvent, as the binder thereof, satisfactory reliability can be realized without considerable reduction in the discharge capacity even after use with considerable change in the temperature, and thus excellent productivity can be obtained.

DETAILED DESCRIPTION OF THE INVENTION

A non-aqueous electrolyte secondary battery according to the present invention will now be described.

The non-aqueous electrolyte secondary battery according to the present invention includes a cathode and an anode, wherein the active material of the cathode and/or that of the anode is integrated by a binder, and the cathode and the anode are stacked through a separator and accommodated in a battery can together with a non-aqueous electrolyte. The non-aqueous electrolyte secondary battery is characterized in that the binder of the cathode and/or the anode is made of a mixture of polyimide, in which conversion to imide has been completed and which is soluble in an organic solvent and fluorine polymer.

Polyimide employed to serve as the binder is a polymer, which has been converted into imide at least before it is mixed with the depolarizing mix as the binder and which is soluble in an organic solvent. The polyimide has, in the main chain thereof, an imide group expressed by Chemical Formula 3, the polyimide including total aromatic polyimides, polyamidoimide and polyether imides.

[Chemical Formula 3]

The total aromatic polyimides may be a polymer expressed by Chemical Formula 4.

[Chemical Formula 4]

where $Ar_1$ and $Ar_2$ are aryl and n is an integer not smaller than 1

The polyimide according to the present invention and expressed in Chemical Formula 4 is not limited particularly. Polyimides disclosed in Japanese Patent Laid-Open No. 63-199239, Japanese Patent Laid-Open No. 64-121, Japanese Patent Laid-Open No. 64-22963 and Japanese Patent Laid-Open No. 1-143867 may be employed.

The polyimides are not limited particularly. The polyimide can be prepared by causing tetracarboxylic acid dianhydride, such as pyromellitic dianhydride (PMDA), and diamine, such as bis (4-aminophenyl) ether (ODA), to react with each other in an appropriate solvent to obtain a polyamic acid, after which cyclodehydrating agent, such as a mixed solvent of hot acetic acid or acetic anhydride and pyridine, is caused to act so as to dehydrate the material. Although the solvent for use in the above-mentioned process is not limited particularly, N, N-dimethylacetoamide (DMAc), N-methyl- 2-pyrolidone (NMP) or diglime may be employed in the present invention.

It is preferable that the polyimide be contained in the binder by a quantity not less than 5 wt % nor more than 90 wt %.

If the content of the polyimide is higher than 90 wt %, the rigid molecular chains of the polyimide cause the manufactured electrode to have a rigid characteristic. Thus, the electrode has a low tolerance to bending. As a result, cracks are generated in the electrode and thus the discharge capacity is reduced excessively.

If the content of the polyimide is lower than 5 wt %, the effect of the excellent binding properties of the polyimide on the electrode becomes unsatisfactory. In this case, the major portion of the binder is composed of the fluorine polymer having poor binding properties. Therefore, rapid change in the temperature causes the depolarizing mix to be desorbed from the collector. As a result, the discharge capacity is excessively reduced.

The polyimide is employed as the binder in such a manner that the polyimide is mixed with the fluorine polymer. Although the fluorine polymer is not limited particularly, any one of the following materials may be employed in the present invention: fluororesin, such as PVdF, PTFE, tetrafluoroethylene, hexafluoropropylene copolymer (FEP), polyvinyl fluoride (PVF) or ethylene-tetrafluoroethylene copolymer (ETFE); and fluorine rubber, such as a binary copolymer of vinylidene fluoride and hexafluoropropylene (VdF-HFP), a ternary copolymer of vinylidene fluoride, hexafluoropropylene and tetrafluoropropylene (VdF-HFP-TFE), a binary copolymer of tetrafluoroethylene and propylene (TFE-Pr) and a ternary copolymer of tetrafluoroethylene, propylene and polyvinylidene fluoride (TFE-Pr-VdF).

In particular, PVdF having excellent oxidation resistance and solubility in an organic solvent is able to improve the dispersion characteristic of the depolarizing mix and the binding properties between the depolarizing mix and the collector.

Although PVdF is not limited particularly, 1, 1-difluoroethylene is, together with an additive, such as a polymerization initiator, for example, persulfate or organic peroxide, or a fluorine surface active agent, suspension-polymerized or emulsion-polymerized in an appropriate reaction medium, such as water or carbon tetrachloride so that PVdF is obtained. The thus-obtained PVdF can be employed as a preferred binder according to the present invention.

Since the non-aqueous electrolyte battery according to the present invention includes the binder made of polyimide which exhibits excellent binding properties and in which conversion to imide has been completed, the active materials are not desorbed from the collector even if it is used with rapid change in the temperature and the reduction of the discharge capacity can be prevented. Since the non-aqueous electrolyte battery includes the polyimide soluble in an organic solvent, excellent productivity can be realized when the electrodes are manufactured.

Although the active material for use in the cathode of the non-aqueous electrolyte battery is not limited particularly, a chalcogen compound into which lithium ions can be inserted and from which the same can be desorbed or a composite chalcogen compound containing lithium may be employed.

The chalcogen compound is exemplified by $FeS_2$, $TiS_2$, $MoS_2$, $V_2O_5$, $V_6O_{13}$ and $MnO_2$. The composite chalcogen compound is exemplified by $LiCoO_2$, lithium compounds expressed by $Li_xNi_yM_{1-y}O_2$ (where M is at least one or more types of metal elements selected from transition elements and Al, preferably at least one or more metal elements selected from Co, Fe, Mn, Ti, Cr, V and Al, $0.05 \leq x \leq 1.10$ and $0.5 \leq y \leq 1.0$ are satisfied), $LiNiO_2$, $LiMnO_2$ and $LiMn_2O_4$. The foregoing materials can be obtained by using oxides, salts or hydrides of lithium, cobalt, nickel and manganese as starting materials, and then the starting materials are mixed to obtain a required compositions, and then the mixed materials are baked at 600° C. to 1000° C. in the presence of oxygen.

Although the conductive material for use in the depolarizing mix for the cathode is not limited particularly, metal powder, carbon powder or the like is employed. The carbon powder is exemplified by pyrolytic carbon, such as carbon black, its graphitized product, artificial or natural scale graphite powder, and carbon fiber and its graphitized product. Also, a mixed material of the carbon powder may be employed.

The active material for use in the anode of the non-aqueous electrolyte battery according to the present invention is not limited particularly. A material may be employed, into which lithium ions can be inserted and from which the same can be desorbed. That is, lithium metal, lithium alloys (an alloy of lithium and aluminum, lead or indium), a carbonaceous material or a polymer, such as polyacetylene or polypyrrole, may be employed.

When the lithium metal is employed in the anode of the non-aqueous electrolyte primary battery, a great capacity can be obtained for the battery.

When the carbon material or the like, into which lithium can be inserted and from which the same can be desorbed, is employed in the anode of the non-aqueous electrolyte secondary battery, an excellent cycle life can be realized. Although carbonaceous material is not limited particularly, pyrolytic carbon, coke (pitch coke, needle coke and petroleum coke), graphite, vitreous carbon, a baked organic polymer compound (material obtained by baking phenol resin or furan resin at an appropriate temperature), carbon fiber or active carbon may be employed.

In particular, non-graphitizable carbon is a preferred material because it has a great charging/discharging performance per weight and an excellent cycle characteristic. A preferred non-graphitizable carbon has a structure that the plane distance between (002) planes is 0.370 nm or longer, the true density is lower than 1.70 g/cm$^3$ and no heat peak is observed in a temperature range not lower than 700° C. as a result of differential thermal analysis performed in an air flow.

A material having the above-mentioned characteristics is exemplified by a carbonaceous material which can be obtained from an organic material by a means, such as baking. A preferred starting material for the carbonizing process is furan resin composed of homopolymer or copolymer of furfuryl alcohol or furfural. Specifically, a carboneceous material which can be obtained by baking any one of the following polymers has excellent characteristics as the material of the anode of the non-aqueous electrolyte secondary battery: furfural+phenol, furfuryl alcohol+dimethylolurea, furfuryl alcohol, furfuryl alcohol+formaldehyde, furfuryl alcohol+furfural and furfural+ketones.

Also, a carboneceous material which is a preferred material can be obtained by a process in which a petroleum pitch having a hydrogen/carbon atom ratio of 0.6 to 0.8 is employed, after which a functional group containing oxygen is introduced into the raw material to perform a so-called oxygen crosslinking to obtain a precursor containing oxygen by 10 wt % to 20 wt %, and then the precursor is baked.

Another carboneceous material may be employed in which a phosphorus compound or a boron compound is added when the furan resin or the petroleum pitch is carbonized to enlarge the quantity of doping with respect to lithium.

The graphitizing material must have a true specific gravity of 2.10 g/cm$^3$ or higher, preferably 2.18 g/cm$^3$ or higher. To obtain the above-mentioned true specific gravity, the plane distance between (002) planes obtained by X-ray diffraction must be not smaller than 0.335 nm nor greater than 0.34 nm, preferably not smaller than 0.335 nm nor greater than 0.337 nm. It is preferable that the thickness of a crystallite in the direction of the c-axis be 16.0 nm or greater, preferably 24.0 nm or greater.

When the non-aqueous electrolyte secondary battery is manufactured, the non-aqueous electrolyte is in the form in which a lithium salt is employed as an electrolyte and the electrolyte is dissolved in an organic solvent. Although the organic solvent is not limited particularly, one or more the following materials may be employed: propylene carbonate, ethylene carbonate, 1, 2-dimethoxyethane, γ-butyllactone, diethylether, tetrahydrofuran, 2-methyl-tetrahydrofuran, 1,3-dioxolan, sulfolan, acetonitrile, dimethylcarbonate, diethylcarbonate, dipropylcarbonate, methylethylcarbonate, and methylpropylcarbonate.

Although the electrolyte is not limited, any one of the following materials may be employed: $LiClO_4$, $LiAsF_6$, $LiPF_6$, $LiBF_4$, $LiB\ (C_6H_5)_4$, $LiCl$, $LiBr$, $LiSO_3CH_3$, $LiSO_3CF_3$, $LiN\ (SO_2CF_3)_2$ and $LiC\ (SO_2CF_3)_3$.

Although the shape of the collector for use in the non-aqueous electrolyte battery according to the present invention is not limited particularly, a collector in the form of a net, such as foil, mesh and expanded metal, may be employed. It is preferable that the material of the collector of the cathode is aluminum foil, stainless steel foil or nickel foil. The preferred thickness is 10 μm to 40 μm. It is preferable that the material of the collector of the anode is copper foil, stainless steel foil or nickel foil. The preferred thickness is 5 μm to 20 μm.

The above-mentioned cathode and the anode are stacked through the separator, and then accommodated in a battery can. Although the separator is not limited particularly, the separator is made of woven fabric, unwoven fabric or a porous synthetic resin film. In particular, the porous synthetic resin film is a preferred material. Specifically, a small-porosity polyolefin film is a preferred material because of a sufficient thickness and satisfactory film strength and film resistance. Concretely, polyethylene or polypropylene porous film or a porous film made of their combination is employed.

To obtained safe sealed non-aqueous electrolyte battery, it is preferable that the non-aqueous electrolyte battery is provided with a means for detecting rise in the internal voltage thereof to interrupt flow of an electric current in an abnormal case, such as overcharge.

EXAMPLES

Examples of the present invention will now be described. Note that the present disclosure of the preferred form can be changed in the details of construction and in the combination and arrangement of parts without departing from the spirit and the scope of the invention.

Figure 1:
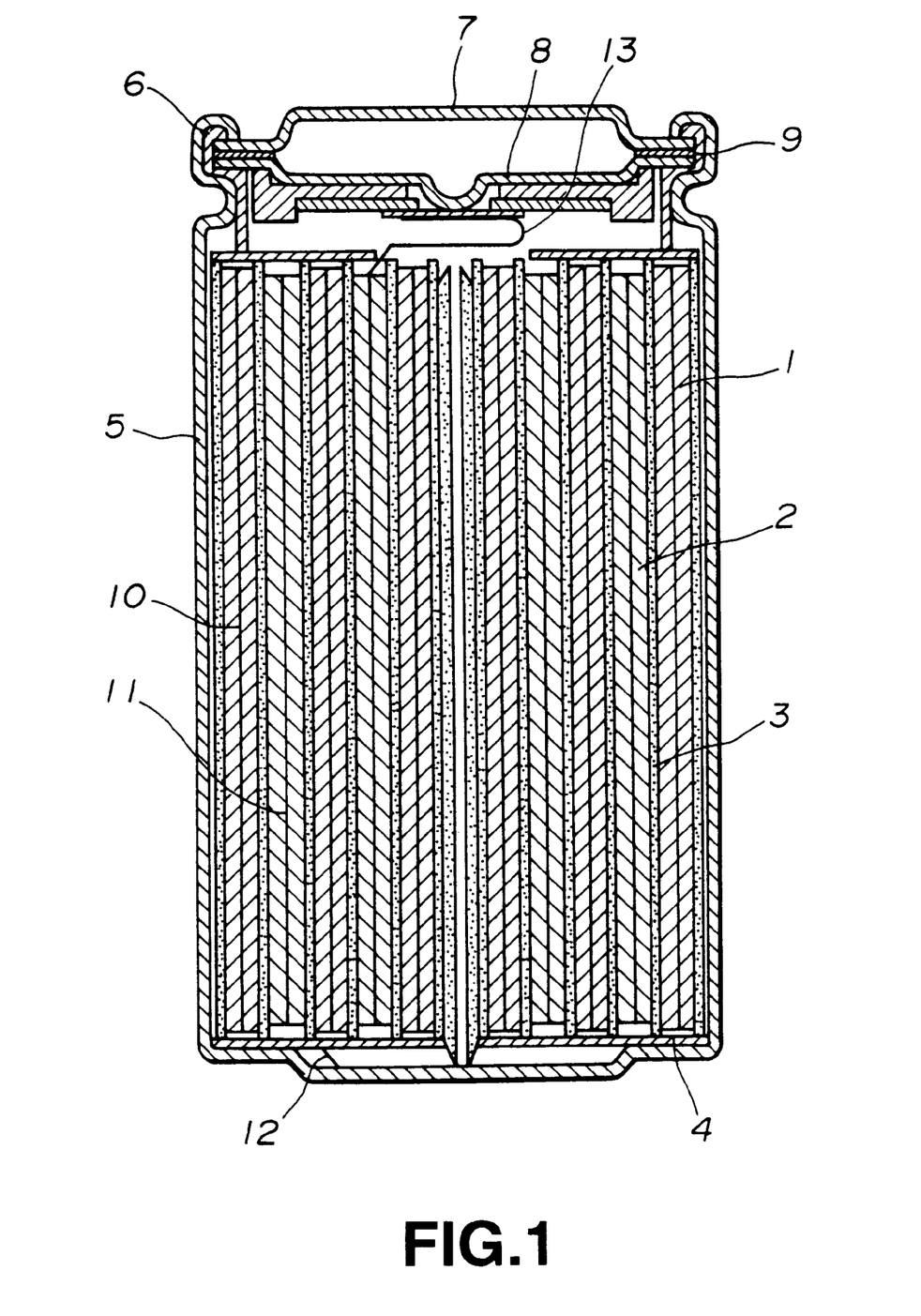
FIG. 1 is a cross sectional view showing the structure of a non-aqueous electrolyte secondary battery according to the present invention.

Examples 1 to 7 were performed in such a manner that a lithium-cobalt oxide was employed as the active material of the cathode and non-graphitizable carbon material was employed as the active material of the anode so that a cylindrical non-aqueous electrolyte secondary battery as shown in FIG. 1 was manufactured. As the binder of the cathode, a mixture of polyimide (95V1001, trade name of Sony Chemical) (hereinafter called a "soluble polyimide") which was expressed by Chemical Formula 4, in which conversion to imide was completed and which was soluble in an organic solvent and the fluorine polymer was employed.

On the other hand, Comparative Examples 1 to 4 were performed in such a manner that the binders were made of only the soluble polyimide, only the fluorine polymer and polyamic acid easily soluble in an organic solvent, such as NMP, and which was not converted into imide before use. When polyamic acid was heated to complete the conversion to the imide, polyimide expressed by Chemical Formula 5 was obtained. However, the thus-obtained polyimide was not soluble in an organic solvent, such as NMP.

EXAMPLE 1

Initially, soluble polyimide and PVdF which was the fluorine polymer were employed as the binder of the cathode in such a manner that 2.7 parts by weight of the soluble polyimide and 0.3 part by weight of PVdF were sufficiently mixed with each other so that a binder containing the soluble polyimide by 90 wt % was obtained.

Then, active material $LiCoO_2$ Of the cathode was prepared as follows: lithium carbonate and cobalt carbonate were mixed in such a manner that Li/Co=1, and then baked in air at 900° C. for 5 hours. The thus-obtained material was evaluated by X-ray diffraction. As a result, the obtained material satisfactorily coincided with $LiCoO_2$ of the JCPDS card. Then, the material was pulverized by an automatic mortar so that a required active material $LiCoO_2$ of the cathode was obtained.

Then, 91 wt % of the thus obtained $LiCoO_2$, 6 wt % of graphite serving as the conductive material and 3 wt % of a mixture of soluble polyimide and PVdF serving as the binder were mixed with one another so that a depolarizing mix for the cathode was prepared. Then, the depolarizing mix was dispersed in N-methyl-2-pyrolidone (NMP) to be formed into slurry. Then, the slurry was applied to the two sides of elongated aluminum foil which was a cathode collector 11, after which the two sides were dried, and then the aluminum foil was compression-molded by a roller press so that a cathode 2 was manufactured.

Then, the material for the anode was prepared as follows: petroleum pitch was employed as the starting material, and then a functional group containing oxygen was crosslinked (oxygen crosslinking) by 10% to 20%, and then the material was baked at 1000° C. in an inert gas. As a result, a non-graphitizable carbon material having characteristics similar to those of vitreous carbon was obtained. The thus-obtained material was measured by X-ray diffraction, thus resulting in that the distance between planes (002) was 0.376 nm and the true specific gravity was 1.58 g/cm³.

Then, 90 wt % of the thus-obtained carbon material and 10 wt % of PVdF serving as the binder were mixed with each other so that a depolarizing mix for the anode was manufactured. Then, the depolarizing mix was dispersed in the NMP to be formed into slurry. Then, the slurry was applied to the two sides of elongated copper foil which was an anode collector 10, after which the two sides were dried, and then the anode collector 10 was compression-molded so that an anode 1 was manufactured.

Then, the elongated cathode 2 and the anode 1 were stacked through a separator 3 formed by a 25 μm-porous polypropylene film, and then the stacked member was wound into a swirl so that a coil member was manufactured.

Then, an insulation plate 4 was inserted into the bottom of an iron battery can 5 applied with nickel plating so that the coil member was accommodated. To collect an electric current from the anode, an end of a nickel anode lead 12 was forcibly joined to the anode 1 and another end of the anode lead 12 was forcibly joined to the battery can 5. To collect an electric current from the cathode, an end of an aluminum cathode lead 13 was joined to the cathode 2 and another end

[Chemical Formula 5]

where $Ar_1$ and $Ar_2$ are aryl and n is an integer not smaller than 1 of the cathode lead 13 was welded to a projection of a safety-valve unit 8 electrically conducted with a battery cover 7.

Then, an electrolyte, in which LiPF$_6$ was, by 1 mol/liter, dissolved in a mixed solvent of 50 volume % propylenecarbonate and 50 volume % diethylcarbonate, was injected into the battery can 5. Then, the battery can 5 was caulked through an insulation sealing gasket 6 applied with asphalt so that the safety-valve unit 8 having an electric-current interrupting mechanism, a PTC device 9 and the battery cover 7 were secured and the airtightness in the battery was realized. As a result, a cylindrical non-aqueous electrolyte secondary battery having a diameter of 18 mm and a height of 65 mm was manufactured.

EXAMPLE 2

Soluble polyimide and PVdF which was the fluorine polymer were employed as the binder of the cathode in such a manner that 1.5 parts by weight of the soluble polyimide and 1.5 parts by weight of PVdF were sufficiently mixed with each other so that a required binder was obtained. The content of the soluble polyimide in the binder was 50 wt %. A cylindrical non-aqueous electrolyte secondary battery was manufactured by a method similar to that according to Example 1 except for the above-mentioned binder for the cathode.

EXAMPLE 3

Soluble polyimide and PVdF which was the fluorine polymer were employed as the binder of the cathode in such a manner that 0.5 part by weight of the soluble polyimide and 2.5 parts by weight of PVdF were sufficiently mixed with each other so that a required binder was obtained. The content of the soluble polyimide in the binder was 16.7 wt %. A cylindrical non-aqueous electrolyte secondary battery was manufactured by a method similar to that according to Example 1 except for the above-mentioned binder for the cathode.

EXAMPLE 4

Soluble polyimide and PVdF which was the fluorine polymer were employed as the binder of the cathode in such a manner that 0.15 part by weight of the soluble polyimide and 2.85 parts by weight of PVdF were sufficiently mixed with each other so that a required binder was obtained. The content of the soluble polyimide in the binder was 5 wt %. A cylindrical non-aqueous electrolyte secondary battery was manufactured by a method similar to that according to Example 1 except for the above-mentioned binder for the cathode.

EXAMPLE 5

Soluble polyimide and PVdF which was the fluorine polymer were employed as the binder of the cathode in such a manner that 0.09 part by weight of the soluble polyimide and 2.91 parts by weight of PVdF were sufficiently mixed with each other so that a required binder was obtained. The content of the soluble polyimide in the binder was 3 wt %. A cylindrical non-aqueous electrolyte secondary battery was manufactured by a method similar to that according to Example 1 except for the above-mentioned binder for the cathode.

EXAMPLE 6

Soluble polyimide and PVdF which was the fluorine polymer were employed as the binder of the cathode in such a manner that 2.85 parts by weight of the soluble polyimide and 0.15 part by weight of PVdF were sufficiently mixed with each other so that a required binder was obtained. The content of the soluble polyimide in the binder was 95 wt %. A cylindrical non-aqueous electrolyte secondary battery was manufactured by a method similar to that according to Example 1 except for the above-mentioned binder for the cathode.

EXAMPLE 7

Soluble polyimide and PTFE which was the fluorine polymer were employed as the binder of the cathode. The PTFE was obtained by sufficiently drying PTFE dispersion (containing a solid component by 60 wt %) to be formed into powder. Then, 2.7 parts by weight of the soluble polyimide and 0.3 part by weight of PTFE were sufficiently mixed with each other so that a required binder was obtained. The content of the soluble polyimide in the binder was 90 wt %. A cylindrical non-aqueous electrolyte secondary battery was manufactured by a method similar to that according to Example 1 except for the above-mentioned binder for the cathode.

Comparative Example 1

Only PVdF which was the fluorine polymer was employed as the binder of the cathode. Then, 91 wt % of LiCoO$_2$, 6 wt % of graphite serving as the conductive material, and 3 wt % of the above-mentioned binder were mixed with one another so that a depolarizing mix for the cathode was prepared. A similar method to that according to Example 1 was employed except for the foregoing depolarizing mix for the cathode so that a cylindrical non-aqueous electrolyte secondary battery was manufactured.

Comparative Example 2

Only soluble polyimide was employed as the binder of the cathode. Then, 91 wt % of LiCoO$_2$, 6 wt % of graphite serving as the conductive material, and 3 wt % of the above-mentioned binder were mixed with one another so that a depolarizing mix for the cathode was prepared. A similar method to that according to Example 1 was employed except for the foregoing depolarizing mix for the cathode so that a cylindrical non-aqueous electrolyte secondary battery was manufactured.

Comparative Example 3

Only polyamic acid was employed as the binder of the cathode. Then, 91 wt % of LiCoO$_2$, 6 wt % of graphite serving as the conductive material, and 3 wt % of the above-mentioned binder were mixed with one another so that a depolarizing mix for the cathode was prepared. Then, the depolarizing mix for the cathode was dispersed in the NMP to be formed into slurry. The slurry was applied to the two sides of elongated aluminum foil which was the cathode collector 11, and then the two sides were dried in a state where the temperature was raised. At this time, the polyamic acid was completed converted into polyimide. Then, the aluminum foil was compressed by the roller press so that the cathode 2 was manufactured. A similar method to that according to Example 1 was employed except for the foregoing process so that a cylindrical non-aqueous electrolyte secondary battery was manufactured.

Comparative Example 4

Polyamic acid and PVdF which was the fluorine polymer were employed as the binder for the cathode in such a manner that 0.15 part by weight of the polyamic acid and 2.85 parts by weight of the PVdF were sufficiently mixed so that a required binder was obtained. The content of the soluble polyimide in the binder was 90 wt %. Then, 91 wt % of LiCoO$_2$, 6 wt % of graphite serving as the conductive material, and 3 wt % of a mixture of the polyamic acid and PVdF serving as the binder were mixed with one another so that a depolarizing mix for the cathode was prepared. Then, the depolarizing mix for the cathode was dispersed in the NMP to be formed into slurry. The slurry was applied to the two sides of elongated aluminum foil which was the cathode collector 11, and then the two sides were dried in a state where the temperature was raised. At this time, the polyamic acid was completed converted into polyimide. Then, the aluminum foil was compressed by the roller press so that the cathode 2 was manufactured. A similar method to that according to Example 1 was employed except for the foregoing process so that a cylindrical non-aqueous electrolyte secondary battery was manufactured.

Evaluation of the Performance of Battery

To evaluate the performance of the cylindrical non-aqueous electrolyte secondary battery according to Examples 1 to 7 and Comparative Examples 1 to 4, ten samples according to each of the above-mentioned examples and comparative examples were subjected to a temperature change shock test and cycle test.

Temperature Change Shock Test

Initially, each of the cylindrical non-aqueous electrolyte secondary batteries according to Example 1 to 7 and Comparative Examples 1 to 4 was, 10 times, subjected to a cycle in which the cylindrical non-aqueous electrolyte secondary battery was electrically charged for 2.5 hours in an ordinary temperature atmosphere in a state where the upper voltage level was 4.2 V and an electric current in a constant current region was 1A, after which the cylindrical non-aqueous electrolyte secondary battery was discharged with a 0.7A constant current to 2.5 V. The discharge capacity at the 10 cycle to 2.75 V was recorded, the recorded value being obtained as the discharge capacity before the temperature change shock test.

Then, the cylindrical non-aqueous electrolyte secondary battery was charged for 2.5 hours in such a manner that the upper limit for the voltage was 4.2 V and the electric current in the constant current region was 1A. Then, the non-aqueous electrolyte secondary battery was placed in a constant temperature chamber, temperature of which could be controlled. The atmospheric temperature was raised to 60° C. at a rate of 10° C./minute, and then the non-aqueous electrolyte secondary battery was allowed to stand for one hour. Then, the atmospheric temperature was lowered to −30° C. at a rate of 10° C./minute, and then the non-aqueous electrolyte secondary battery was allowed to stand for one hour. Then, a temperature change cycle in which the above-mentioned process was repeated was performed 1000 times.

After the temperature change cycles were performed, the non-aqueous electrolyte secondary battery was electrically charged for 2.5 hours in such a manner that the upper voltage level was 4.2 V and the electric current in the constant current region was 1A after which the same was discharged with a 1A constant current to 2.5 V to record the discharge capacity to 2.75 V to measure the discharge capacity after the temperature change shock test.

The ratio of the discharge capacity after the temperature change shock test with respect to the discharge capacity before the temperature change shock test was calculated as a discharge capacity retention ratio. Table 1 shows results.

TABLE 1

| | Polyimide | Fluorine Polymer | Content of Polyimide in Binder (wt %) | Discharge Capacity Before Test (mAh) | Discharge Capacity Retention Ratio (%) |
|---|---|---|---|---|---|
| Example 1 | Soluble Polyimide | PVdF | 90 | 1314 | 99.7 |
| Example 2 | Soluble Polyimide | PVdF | 50 | 1317 | 99.8 |
| Example 3 | Soluble Polyimide | PVdF | 16.7 | 1320 | 99.7 |
| Example 4 | Soluble Polyimide | PVdF | 5 | 1316 | 99.2 |
| Example 5 | Soluble Polyimide | PVdF | 3 | 1316 | 86.5 |
| Example 6 | Soluble Polyimide | PVdF | 95 | 1305 | 99.5 |
| Example 7 | Soluble Polyimide | PTFE | 90 | 1297 | 98.9 |
| Comparative Example 1 | — | PVdF | 0 | 1314 | 52.4 |
| Comparative Example 2 | Soluble Polyimide | — | 100 | 1070 | 98.8 |
| Comparative Example 3 | Polyamic Acid | — | 100 | 1069 | 97.0 |
| Comparative Example 4 | Polyamic Acid | PVdF | 5 | 1269 | 98.4 |

As can be understood from the discharge capacity retention ratios shown in Table 1, the non-aqueous electrolyte secondary battery according to Examples 1 to 7 including the binder which was the mixture of the soluble polyimide and the fluorine polymer resulted in excellent resistance against temperature change shock.

When the content of the soluble polyimide in the binder was 5 wt % or higher, the effect of the polyimide having the excellent binding properties was enhanced so that a great discharge capacity retention ratio of 98% or higher was realized.

When the content of the soluble polyimide in the binder was 90 wt % or lower, the problem of unsatisfactory resistance of the cathode against bending caused by the rigid molecular chains of the polyimide which resulted in the manufactured cathode having excessively rigid characteristic can be prevented. Therefore, no cracks were generated in the cathode and the discharge capacity was not reduced.

Example 1, which included PVdF as the fluorine polymer, was substantially free from reduction in the discharge capacity as compared with Example 7, which included the PTFE. The reason for this lies in that the PVdF is dissolved in the NMP when the slurry of the depolarizing mix for the cathode is prepared. Thus, the dispersion characteristic of the depolarizing mix for the cathode can be improved, the binding properties between the collector of the cathode and the depolarizing mix for the cathode can be improved and thus desorption of the depolarizing mix for the cathode from the collector can be prevented.

Comparative Example 1, which included only the fluorine polymer as the binder, encountered excessive reduction in the discharge capacity because the depolarizing mix for the cathode was desorbed from the collector when the non-aqueous electrolyte secondary battery was used in a state where rapid temperature change was repeated.

Comparative Example 2 and Comparative Example 3, each of which included only polyimide as the binder, encountered excessive reduction in the initial discharge capacity before the temperature change shock test. The reason for this lies in that the rigid molecular chains of the polyimide caused the manufactured cathode to have the rigid characteristic though the polyimide had excellent binding properties between the depolarizing mix for the cathode and the collector. Thus, the cathode had a low tolerance to bending and thus cracks or the like were generated in the electrode.

Comparative Example 4, which included the polyamic acid and the fluorine polymer as the binder, encountered reduction in the initial discharge capacity as compared with Example 4, which included the soluble polyimide with the same composition. The reason for this lies in that the water generated when the polyamic acid is heated and cyclodehydrated adversely affects the active material of the cathode.

Cycle Test

Then, the cycle test was performed as follows: initially, each of the cylindrical non-aqueous electrolyte secondary batteries according to Example 1 to 7 and Comparative Examples 1 to 4 was subjected to a cycle in which the cylindrical non-aqueous electrolyte secondary battery was electrically charged for 2.5 hours in an ordinary temperature atmosphere in a state where the upper voltage level was 4.2 V and an electric current in a constant current region was 1A, after which the cylindrical non-aqueous electrolyte secondary battery was discharged with a 0.7A constant current to 2.5 V. The discharge capacity to 2.75 V was recorded. The ratio of the discharge capacity at the 200th cycle with respect to that at the 10th cycle was calculated as the cycle retention ratio. Since the discharge capacity at the 10th cycle was the same as that in the temperature change shock test, the result was omitted in Table 2.

TABLE 2

|  | Polyimide | Fluorine Polymer | Content of Polyimide in Binder (wt %) | Cycle Retention Ratio (%) |
| --- | --- | --- | --- | --- |
| Example 1 | Soluble Polyimide | PVdF | 90 | 91.4 |
| Example 2 | Soluble Polyimide | PVdF | 50 | 91.9 |
| Example 3 | Soluble Polyimide | PVdF | 16.7 | 91.7 |
| Example 4 | Soluble Polyimide | PVdF | 5 | 91.8 |
| Example 5 | Soluble Polyimide | PVdF | 3 | 91.8 |
| Example 6 | Soluble Polyimide | PVdF | 95 | 91.0 |
| Example 7 | Soluble Polyimide | PTFE | 90 | 88.3 |
| Comparative Example 1 | — | PVdF | 0 | 91.5 |
| Comparative Example 2 | Soluble Polyimide | — | 100 | 72.7 |
| Comparative Example 3 | Polyamic Acid | — | 100 | 6.7 |
| Comparative Example 4 | Polyamic Acid | PVdF | 5 | 9.3 |

As can be understood from Table 2, Examples 1 to 7 in which the mixture of the soluble polyimide and the fluorine polymer was employed as the binder exhibited excellent cycle retention ratio.

On the other hand, Comparative Example 1 in which only the fluorine polymer was employed as the binder encountered excessive reduction of the initial discharge capacity because of the poor binding properties of the fluorine polymer as described above. Comparative Example 2 in which only the soluble polyimide was employed as the binder resulted in an unsatisfactory cycle characteristic because the cathode was made to be too rigid and thus the cathode had a low tolerance to bending.

Comparative Examples 3 and 4, in each of which the polyamic acid was employed as the binder and the polyamic acid was completely converted into imide by drying the slurry of the depolarizing mix for the cathode applied to the collector in a state where the temperature was raised, encountered generation of water which adversely affected the active material of the cathode. Therefore, the discharge capacity at the 10th cycle deteriorated and the cycle characteristic as well as deteriorated.

When the polyimide, in which conversion to imide has been completed and which is soluble in an organic solvent, and the fluorine polymer are employed as the binder of the depolarizing mix for the cathode, the excellent binding properties of the polyimide can satisfactorily be exhibited. That is, the problem in that the rigid molecular chains of the polyimide cause the manufactured cathode to be excessively rigid and thus the cathode has a low tolerance to bending can be overcome. As a result, cracks or the like of the cathode can be prevented. Moreover, no influence is exerted from water which is generated when the conversion to the imide is performed. Thus, use of the above-mentioned binder results in excellent discharge capacity, the capacity retention ratio and the cycle retention ratio even after the temperature change shock test and the charging and discharging cycles. As a result, a reliable non-aqueous electrolyte secondary battery can be obtained. When the PVdF is employed as the fluorine polymer and more particularly when the content of the soluble polyimide in the binder is made to be not less than 5 wt % nor more than 90 wt %, excellent characteristics can be obtained.

In Examples 8 to 14, $FeS_2$ was employed as the active material of the cathode and metallic lithium was employed as the active material of the anode so that a cylindrical non-aqueous electrolyte primary battery as shown in FIG. 1 was manufactured. As the binder of the cathode, a mixture of polyimide (95V1001, trade name of Sony Chemical) which was expressed by Chemical Formula 4, in which conversion to imide was completed and which was soluble in an organic solvent and the fluorine polymer was employed.

On the other hand, Comparative Examples 5 to 8 were performed in such a manner that the binders were made of only the soluble polyimide, only the fluorine polymer and polyamic acid easily soluble in an organic solvent, such as NMP, and which was not converted into imide before use. When polyamic acid was heated to complete the conversion to the imide, the polyimide expressed by Chemical Formula 4 was obtained. However, the thus-obtained polyimide was not soluble in an organic solvent, such as NMP.

EXAMPLE 8

Initially, soluble polyimide and PVdF which was the fluorine polymer were employed as the binder of the cathode in such a manner that 2.7 parts by weight of the soluble polyimide and 0.3 part by weight of PVdF were sufficiently mixed with each other so that a binder containing the soluble polyimide by 90 wt % was obtained.

Marketed active material $FeS_2$ for the cathode having a purity of 96% was employed. Then, 91 wt % of $FeS_2$, 6 wt % of graphite serving as the conductive material, and 3 wt % of a mixture of the soluble polyimide and PVdF serving as the binder were mixed with one another so that a depolarizing mix for the cathode was prepared. Then, the depolarizing mix was dispersed in N-methyl-2-pyrolidone (NMP) to be formed into slurry. Then, the slurry was applied to the two sides of elongated aluminum foil which was a cathode collector 11, after which the two sides were dried, and then the aluminum foil was compression-molded by a roller press so that a cathode 2 was manufactured.

Then, metallic lithium wound into a coil form was cut so that the anode 1 was manufactured.

Then, the elongated cathode 2 and anode 1 were stacked through a separator 3 formed by a 25 μm-porous polypropylene film, and then the stacked member was wound into a swirl so that a coil member was manufactured.

Then, an insulation plate 4 was inserted into the bottom of an iron battery can 5 applied with nickel plating so that the coil member was accommodated. To collect an electric current from the anode, an end of a nickel anode lead 12 was forcibly joined to the anode 1 and another end of the anode lead 12 was forcibly joined to the battery can 5. To collect an electric current from the cathode, an end of an aluminum cathode lead 13 was joined to the cathode 2 and another end of the cathode lead 13 was welded to a projection of a safety-valve unit 8 electrically conducted with a battery cover 7.

Then, an electrolyte, in which $LiSO_3CF_3$ was, by 0.7 mol/liter, dissolved in a mixed solvent of 50 volume % propylenecarbonate and 50 volume % diethylcarbonate, was injected into the battery can 5. Then, the battery can 5 was caulked through an insulation sealing gasket 6 applied with asphalt so that the safety-valve unit 8 having an electric-current interrupting mechanism, a PTC device 9 and the battery cover 7 were secured and the airtightness in the battery was realized. As a result, a cylindrical non-aqueous electrolyte primary battery having a diameter of 14 mm and a height of 50 mm was manufactured.

EXAMPLE 9

Soluble polyimide and PVdF which was the fluorine polymer were employed as the binder of the cathode in such a manner that 1.5 parts by weight of the soluble polyimide and 1.5 parts by weight of PVdF were sufficiently mixed with each other so that a required binder was obtained. The content of the soluble polyimide in the binder was 50 wt %. A cylindrical non-aqueous electrolyte primary battery was manufactured by a method similar to that according to Example 8 except for the above-mentioned binder for the cathode.

EXAMPLE 10

Soluble polyimide and PVdF which was the fluorine polymer were employed as the binder of the cathode in such a manner that 0.5 part by weight of the soluble polyimide and 2.5 parts by weight of PVdF were sufficiently mixed with each other so that a required binder was obtained. The content of the soluble polyimide in the binder was 16.7 wt %. A cylindrical non-aqueous electrolyte primary battery was manufactured by a method similar to that according to Example 8 except for the above-mentioned binder for the cathode.

EXAMPLE 11

Soluble polyimide and PVdF which was the fluorine polymer were employed as the binder of the cathode in such a manner that 0.15 part by weight of the soluble polyimide and 2.85 parts by weight of PVdF were sufficiently mixed with each other so that a required binder was obtained. The content of the soluble polyimide in the binder was 5 wt %. A cylindrical non-aqueous electrolyte primary battery was manufactured by a method similar to that according to Example 8 except for the above-mentioned binder for the cathode.

EXAMPLE 12

Soluble polyimide and PVdF which was the fluorine polymer were employed as the binder of the cathode in such a manner that 0.09 part by weight of the soluble polyimide and 2.91 parts by weight of PVdF were sufficiently mixed with each other so that a required binder was obtained. The content of the soluble polyimide in the binder was 3 wt %. A cylindrical non-aqueous electrolyte primary battery was manufactured by a method similar to that according to Example 8 except for the above-mentioned binder for the cathode.

EXAMPLE 13

Soluble polyimide and PVdF which was the fluorine polymer were employed as the binder of the cathode in such a manner that 2.85 parts by weight of the soluble polyimide and 0.15 part by weight of PVdF were sufficiently mixed with each other so that a required binder was obtained. The content of the soluble polyimide in the binder was 95 wt %. A cylindrical non-aqueous electrolyte primary battery was manufactured by a method similar to that according to Example 8 except for the above-mentioned binder for the cathode.

EXAMPLE 14

Soluble polyimide and PTFE which was the fluorine polymer were employed as the binder of the cathode. The PTFE was obtained by sufficiently drying PTFE dispersion (containing a solid component by 60 wt %) to be formed into powder. Then, 2.7 parts by weight of the soluble polyimide and 0.3 part by weight of PTFE were sufficiently mixed with each other so that a required binder was obtained. The content of the soluble polyimide in the binder was 90 wt %. A cylindrical non-aqueous electrolyte primary battery was manufactured by a method similar to that according to Example 8 except for the above-mentioned binder for the cathode.

Comparative Example 5

Only PVdF which was the fluorine polymer was employed as the binder of the cathode. Then, 91 wt % of $FeS_2$, 6 wt % of graphite serving as the conductive material, and 3 wt % of the above-mentioned binder were mixed with one another so that a depolarizing mix for the cathode was prepared. A similar method to that according to Example 8 was employed except for the foregoing depolarizing mix for the cathode so that a cylindrical non-aqueous electrolyte primary battery was manufactured.

Comparative Example 6

Only soluble polyimide was employed as the binder of the cathode. Then, 91 wt % of $FeS_2$, 6 wt % of graphite serving as the conductive material, and 3 wt % of the above-mentioned binder were mixed with one another so that a depolarizing mix for the cathode was prepared. A similar method to that according to Example 8 was employed except for the foregoing depolarizing mix for the cathode so that a cylindrical non-aqueous electrolyte primary battery was manufactured.

Comparative Example 7

Only polyamic acid was employed as the binder of the cathode. Then, 91 wt % of $FeS_2$, 6 wt % of graphite serving as the conductive material, and 3 wt % of the above-mentioned binder were mixed with one another so that a depolarizing mix for the cathode was prepared. Then, the depolarizing mix for the cathode was dispersed in the NMP to be formed into slurry. The slurry was applied to the two sides of elongated aluminum foil which was the cathode collector 11, and then the two sides were dried in a state where the temperature was raised. At this time, the polyamic acid was completed converted into polyimide. Then, the aluminum foil was compressed by the roller press so that the cathode 2 was manufactured. A similar method to that according to Example 8 was employed except for the foregoing process so that a cylindrical non-aqueous electrolyte primary battery was manufactured.

Comparative Example 8

Polyamic acid and PVdF which was the fluorine polymer were employed as the binder for the cathode in such a manner that 0.15 part by weight of the polyamic acid and 2.85 parts by weight of the PVdF were sufficiently mixed so that a required binder was obtained. The content of the soluble polyimide in the binder was 90 wt %. Then, 91 wt % of $FeS_2$, 6 wt % of graphite serving as the conductive material, and 3 wt % of a mixture of the polyamic acid and PVdF serving as the binder were mixed with one another so that a depolarizing mix for the cathode was prepared. Then, the depolarizing mix for the cathode was dispersed in the NMP to be formed into slurry. The slurry was applied to the two sides of elongated aluminum foil which was the cathode collector 11, and then the two sides were dried in a state where the temperature was raised. At this time, the polyamic acid was completed converted into polyimide. Then, the aluminum foil was compressed by the roller press so that the cathode 2 was manufactured. A similar method to that according to Example 8 was employed except for the foregoing process so that a cylindrical non-aqueous electrolyte primary battery was manufactured.

Evaluation of the Performance of Battery

To evaluate the performance of the cylindrical non-aqueous electrolyte primary battery according to Examples 8 to 14 and Comparative Examples 5 to 8, ten samples according to each of the above-mentioned examples and comparative examples were subjected to a temperature change shock test and cycle test.

Temperature Change Shock Test

Initially, each of the cylindrical non-aqueous electrolyte primary batteries according to Example 8 to 14 and Comparative Examples 5 to 8 was placed in a constant temperature chamber, temperature of which could be controlled. The atmospheric temperature was raised to 60° C. at a rate of 10° C./minute, and then the non-aqueous electrolyte primary battery was allowed to stand for one hour. Then, the atmospheric temperature was lowered to −30° C. at a rate of 10° C./minute, and then the non-aqueous electrolyte primary battery was allowed to stand for one hour. Then, a temperature change cycle in which the above-mentioned process was repeated was performed 1000 times.

After the temperature change cycles were performed, the non-aqueous electrolyte primary battery was electrically discharged with a 500 mA constant current to 0.5 V so that the discharge capacity to 0.9 V was recorded.

To make a comparison, the temperature change shock test was not performed and the non-aqueous electrolyte primary battery was discharged with a 500 mA constant current to 0.5 V so that the discharge capacity to 0.9 V was recorded. Thus, the ratio of the discharge capacity with respect to the discharge capacity after the temperature change shock test was calculated as a discharge capacity retention ratio. Table 3 shows results.

TABLE 3

|  | Polyimide | Fluorine Polymer | Content of Polyimide in Binder (wt %) | Discharge Capacity Before Test (mAh) | Discharge Capacity Retention Ratio (%) |
| --- | --- | --- | --- | --- | --- |
| Example 8 | Soluble Polyimide | PVdF | 90 | 2233 | 99.7 |
| Example 9 | Soluble Polyimide | PVdF | 50 | 2232 | 99.9 |
| Example 10 | Soluble Polyimide | PVdF | 16.7 | 2229 | 99.6 |
| Example 11 | Soluble Polyimide | PVdF | 5 | 2234 | 99.8 |
| Example 12 | Soluble Polyimide | PVdF | 3 | 2231 | 85.4 |
| Example 13 | Soluble Polyimide | PVdF | 95 | 2150 | 99.4 |
| Example 14 | Soluble Polyimide | PTFE | 90 | 2197 | 99.1 |
| Comparative Example 5 | — | PVdF | 0 | 2230 | 55.8 |
| Comparative Example 6 | Soluble Polyimide | — | 100 | 1783 | 99.5 |
| Comparative Example 7 | Polyamic Acid | — | 100 | 1750 | 96.5 |
| Comparative Example 8 | Polyamic Acid | PVdF | 5 | 2005 | 97.0 |

As can be understood from the discharge capacity retention ratios shown in Table 3, the non-aqueous electrolyte primary battery according to Examples 8 to 14 including the binder which was the mixture of the soluble polyimide and the fluorine polymer resulted in excellent resistance against temperature change shock.

When the content of the soluble polyimide in the binder was 5 wt % or higher, the effect of the polyimide having the excellent binding properties was enhanced so that a great discharge capacity retention ratio of 99% or higher was realized.

When the content of the soluble polyimide in the binder was 90 wt % or lower, the problem of unsatisfactory resistance of the cathode against bending caused by the rigid molecular chains of the polyimide which resulted in the manufactured cathode having excessively rigid characteristic can be prevented. Therefore, no cracks were generated in the cathode and the discharge capacity was not reduced.

Example 8, which included PVdF as the fluorine polymer, was substantially free from reduction in the discharge capacity as compared with Example 14, which included the PTFE. The reason for this lies in that the PVdF is dissolved in the NMP when the slurry of the depolarizing mix for the cathode is prepared. Thus, the dispersion characteristic of the depolarizing mix for the cathode can be improved, the binding properties between the collector of the cathode and the depolarizing mix for the cathode can be improved and thus desorption of the depolarizing mix for the cathode from the collector can be prevented.

Comparative Example 5, which included only the fluorine polymer as the binder, encountered excessive reduction in the discharge capacity because the depolarizing mix for the cathode was desorbed from the collector when the non-aqueous electrolyte secondary battery was used in a state where rapid temperature change was repeated.

Comparative Example 6 and Comparative Example 7, each of which included only polyimide as the binder, encountered excessive reduction in the initial discharge capacity before the temperature change shock test. The reason for this lies in that the rigid molecular chains of the polyimide caused the manufactured cathode to have the rigid characteristic though the polyimide had excellent binding properties between the depolarizing mix for the cathode and the collector. Thus, the cathode had a low tolerance to bending and thus cracks or the like were generated in the electrode.

Comparative Example 8, which included the polyamic acid and the fluorine polymer as the binder, encountered reduction in the initial discharge capacity as compared with Example 11, which included the soluble polyimide with the same composition. The reason for this lies in that water generated when the polyamic acid is heated and cyclodehydrated adversely affects the active material of the cathode.

When the polyimide, in which conversion to imide has been completed and which is soluble in an organic solvent, and the fluorine polymer are employed as the binder of the depolarizing mix for the cathode, the excellent binding properties of the polyimide can satisfactorily be exhibited. That is, the problem in that the rigid molecular chains of the polyimide cause the manufactured cathode to be excessively rigid and thus the cathode has a low tolerance to bending can be overcome. As a result, cracks or the like of the cathode can be prevented. Moreover, no influence is exerted from water which is generated when the conversion to the imide is performed. Thus, use of the above-mentioned binder results in excellent discharge capacity, the capacity retention ratio and the cycle retention ratio even after the temperature change shock test and the charging and discharging cycles. As a result, a reliable non-aqueous electrolyte secondary battery can be obtained. When the PVdF is employed as the fluorine polymer and more particularly when the content of the soluble polyimide in the binder is made to be not less than 5 wt % nor more than 90 wt %, excellent characteristics can be obtained.

Although the above-mentioned embodiment has been described about the structure in which the present invention is applied to the cylindrical non-aqueous electrolyte battery, the present invention is not limited to the shape of the battery. Thus, the present invention can be applied a variety of non-aqueous electrolyte batteries having, for example, coin, rectangular, elliptic, button, paper shapes.

Although the above-mentioned embodiment has been described about the structure in which the present invention is applied to the binder of the cathode, the present invention is not limited to the cathode.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte battery comprising:

a cathode and an anode in which an active material for at least one of said cathode and said anode is integrated by a binder; and a non-aqueous electrolyte, said binder being a mixture of a fluorine polymer and polyimide, which polyimide is soluble in an organic solvent, said polyimide being in a quantity of not less than 5 wt % and not more than 90 wt % of the binder, said polyimide being a compound expressed by a formula:

wherein $Ar_1$ and $Ar_2$ are aryl and n is an integer not smaller than 1.

2. A non-aqueous electrolyte battery according to claim 1, wherein the fluorine polymer is polyvinylidene fluoride.

3. A non-aqueous electrolyte battery according to claim 1, wherein
said cathode is made of an active material made of a chalcogen compound, into which lithium ions can be inserted and from which lithium ions can be desorbed, or a composite chalcogen compound containing lithium, and
said anode is made of an active material into which lithium ions can be inserted and from which lithium ions can be desorbed.

4. A non-aqueous electrolyte battery according to claim 3, wherein said chalcogen compound is, any one of $FeS_2$, $TiS_2$, $MoS_2$, $V_2O_5$, $V_6O_{13}$ and $MnO_2$.

5. A non-aqueous electrolyte battery according to claim 3, wherein said composite chalcogen compound is any one of $LiCoO_2$, a lithium composite oxide expressed by $Li_xNi_yM_{1-y}O_2$ (where M is at least one or more types of metal elements selected from transition elements and Al and $0.05 \leq x \leq 1.10$ and $0.5 \leq y \leq 1.0$ are satisfied), $LiNiO_2$, $LiMnO_2$ and $LiMn_2O_4$.

6. A non-aqueous electrolyte battery according to claim 5, wherein said transition metal is at least one metal element selected from a group consisting of Co, Fe, Mn, Ti, Cr, V and Al.

7. A non-aqueous electrolyte battery according to claim 1, wherein said active material for said anode is a carbon material into which lithium can be inserted and from lithium can be desorbed.

8. A non-aqueous electrolyte battery according to claim 7, wherein said carbon material is non-graphitizable carbon.

9. A non-aqueous electrolyte battery according to claim 7, wherein said carbon material is graphitizable carbon.

10. A non-aqueous electrolyte battery according to claim 8, wherein said non-graphitizable carbon material is non-graphitizable carbon material in which the distance between planes (002) is 0.370 nm or longer, and the true density is lower than 1.70 g/cm$^3$.

11. A non-aqueous electrolyte battery according to claim 9, wherein said graphitizable material is a graphitizable material in which the distance between planes (002) is not shorter than 0.335 nm nor longer than 0.337 nm, the true density is 2.10 g/cm$^3$ or higher and the thickness of the crystal in the direction of c-axis is 1.60 nm or greater.

12. A non-aqueous electrolyte battery according to claim 1, wherein said non-aqueous electrolyte is made of at least one material selected from a group consisting of propylene carbonate, ethylene carbonate, 1, 2-dimethoxyethane, γ-butyllactone, diethylether, tetrahydrofuran, 2-methyltetrahydrofuran, 1, 3-dioxolan, sulfolan, acetonitrile, dimethylcarbonate, diethylcarbonate, dipropylcarbonate, methylethylcarbonate and methylpropylcarbonate.

* * * * *